United States Patent
Weerasinghe (10) Patent No.: US 9,866,461 B2
(45) Date of Patent: *Jan. 9, 2018

(54) SYSTEMS AND METHODS TO EMULATE USER NETWORK ACTIVITY

(71) Applicant: AT&T Intellectual Property I, L.P., Atlanta, GA (US)

(72) Inventor: Srilal Weerasinghe, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 373 days.

This patent is subject to a terminal disclaimer.

(21) Appl. No.: 13/888,983

(22) Filed: May 7, 2013

(65) Prior Publication Data
US 2013/0246618 A1 Sep. 19, 2013

Related U.S. Application Data

(63) Continuation of application No. 12/248,162, filed on Oct. 9, 2008, now Pat. No. 8,463,897.

(51) Int. Cl.
| | | |
|---|---|---|
| G06F 15/173 | (2006.01) | |
| H04L 12/26 | (2006.01) | |
| H04L 12/58 | (2006.01) | |
| H04L 29/08 | (2006.01) | |
| G06F 11/34 | (2006.01) | |

(52) U.S. Cl.
CPC .......... *H04L 43/0876* (2013.01); *H04L 51/34* (2013.01); *H04L 67/22* (2013.01); *H04L 67/306* (2013.01); *G06F 11/3495* (2013.01); *G06F 2201/875* (2013.01)

(58) Field of Classification Search
CPC ................................ H04L 67/22; H04L 67/30
USPC .................................................. 709/223, 224
See application file for complete search history.

(56) References Cited

U.S. PATENT DOCUMENTS

| | | | |
|---|---|---|---|
| 5,710,884 A | 1/1998 | Dedrick | |
| 5,961,593 A | 10/1999 | Gabber et al. | |
| 6,141,010 A | 10/2000 | Hoyle | |
| 6,237,022 B1* | 5/2001 | Bruck ..................... H04L 29/06 | |
| | | | 709/200 |
| 6,446,261 B1 | 9/2002 | Rosser | |
| 6,502,192 B1 | 12/2002 | Nguyen | |
| 6,654,725 B1 | 11/2003 | Langheinrich et al. | |
| 6,816,885 B1 | 11/2004 | Raghunandan | |
| 6,895,406 B2 | 5/2005 | Fables et al. | |
| 7,194,421 B2 | 3/2007 | Conkwright et al. | |
| 7,197,472 B2 | 3/2007 | Conkwright et al. | |
| 7,200,804 B1 | 4/2007 | Khavari et al. | |
| 7,237,024 B2 | 6/2007 | Toomey | |
| 7,239,868 B2 | 7/2007 | Furukawa et al. | |
| 7,383,243 B2 | 6/2008 | Conkwright et al. | |
| 7,523,191 B1* | 4/2009 | Thomas .............. G06F 11/3438 | |
| | | | 709/202 |
| 7,693,283 B2 | 4/2010 | Livesay | |

(Continued)

*Primary Examiner* — Wing F Chan
*Assistant Examiner* — Andrew Woo
(74) *Attorney, Agent, or Firm* — Toler Law Group, PC (57) ABSTRACT

A method includes monitoring network activity corresponding to a user device to detect a period of inactivity and generating additional network activity that is different from the network activity in response to detecting the period of inactivity. The additional network activity obscures a profile of a user. The profile is generated by a remote user tracking engine.

20 Claims, 8 Drawing Sheets

(56) References Cited

U.S. PATENT DOCUMENTS

| | | |
|---|---|---|
| 2001/0037404 A1 | 11/2001 | Hafsteinsson et al. |
| 2001/0049620 A1 | 12/2001 | Blasko |
| 2002/0019764 A1* | 2/2002 | Mascarenhas ......... G06Q 30/02 707/792 |
| 2003/0051253 A1 | 3/2003 | Barone, Jr. |
| 2003/0088872 A1 | 5/2003 | Maissel et al. |
| 2003/0187925 A1* | 10/2003 | Inala .................... G06F 17/243 709/204 |
| 2004/0049787 A1 | 3/2004 | Maissel et al. |
| 2005/0273856 A1 | 12/2005 | Huddleston |
| 2006/0080383 A1* | 4/2006 | Hasson .................. H04L 67/06 709/203 |
| 2006/0161796 A1* | 7/2006 | Cromer ................ G06F 9/4418 713/323 |
| 2006/0253582 A1* | 11/2006 | Dixon ............. G06F 17/30864 709/225 |
| 2006/0274896 A1 | 12/2006 | Livesay |
| 2007/0078849 A1 | 4/2007 | Slothouber |
| 2007/0150343 A1 | 6/2007 | Kannapell, II et al. |
| 2007/0180380 A1 | 8/2007 | Khavari et al. |
| 2008/0199042 A1 | 8/2008 | Smith |
| 2008/0235385 A1 | 9/2008 | Li |
| 2008/0255944 A1 | 10/2008 | Shah et al. |
| 2008/0301297 A1 | 12/2008 | Malcolm et al. |
| 2009/0019354 A1* | 1/2009 | Jaiswal ............... G06F 17/3089 715/224 |
| 2009/0077060 A1 | 3/2009 | Sermersheim et al. |
| 2009/0172728 A1* | 7/2009 | Shkedi .................. G06Q 30/02 725/34 |
| 2009/0259518 A1 | 10/2009 | Harvey et al. |
| 2010/0094612 A1 | 4/2010 | Weerasinghe |

* cited by examiner

SYSTEMS AND METHODS TO EMULATE USER NETWORK ACTIVITY

CLAIM OF PRIORITY

The present application claims priority from and is a continuation of U.S. patent application Ser. No. 12/248,162 filed on Oct. 9, 2008, and entitled "SYSTEMS AND METHODS TO EMULATE USER NETWORK ACTIVITY," the content of which is incorporated herein in its entirety.

FIELD OF THE DISCLOSURE

The present disclosure relates generally to emulating user network activity to protect user privacy.

BACKGROUND

Many sites on the Internet frequently collect web browsing data or user behavioral data. One use of collecting such data is to build user profiles. The process of profiling (also known as "tracking") can include assembly and analysis of observed activity on a network. The network activity is attributable to an originating entity and the network activity is monitored in order to gain information (e.g., patterns of activity) relating to the originating entity. For example, some organizations engage in the profiling of a person's web browsing, collecting the URLs of sites visited by the person. The resulting profile of the person can be linked with information that personally identifies the person who did the browsing.

One use of user profiling is to deliver targeted advertising to consumers. Although aggregate data may not constitute a privacy violation, certain consumers and privacy advocacy groups consider user profiling an invasion of privacy per se. Profiling may create a more serious privacy concern when data-matching associates the profile of an individual with personally-identifiable information of the individual. Furthermore, products being sold through targeted advertisements may not be in the best interest of the consumer.

DETAILED DESCRIPTION

Systems and methods for emulating user network activity are disclosed. In a particular embodiment, a method is disclosed that includes monitoring network activity corresponding to a particular user and automatically generating emulated user network activity when a particular usage pattern is detected. The emulated user network activity is detectable by a user tracking engine as the network activity of the particular user.

In another embodiment, a system is disclosed that includes a processor and a memory accessible to the processor. The memory includes an anti-profiling component that is executable by the processor to automatically send a plurality of requests to network resources via a public network. The plurality of requests are configured to be detected by a tracking engine as network activity of the user and to be used by the tracking engine to generate an obscured profile of the user. The memory also includes a list of approved terms to be used by the anti-profiling component to be included in at least one request of the plurality of requests.

Figure 1:
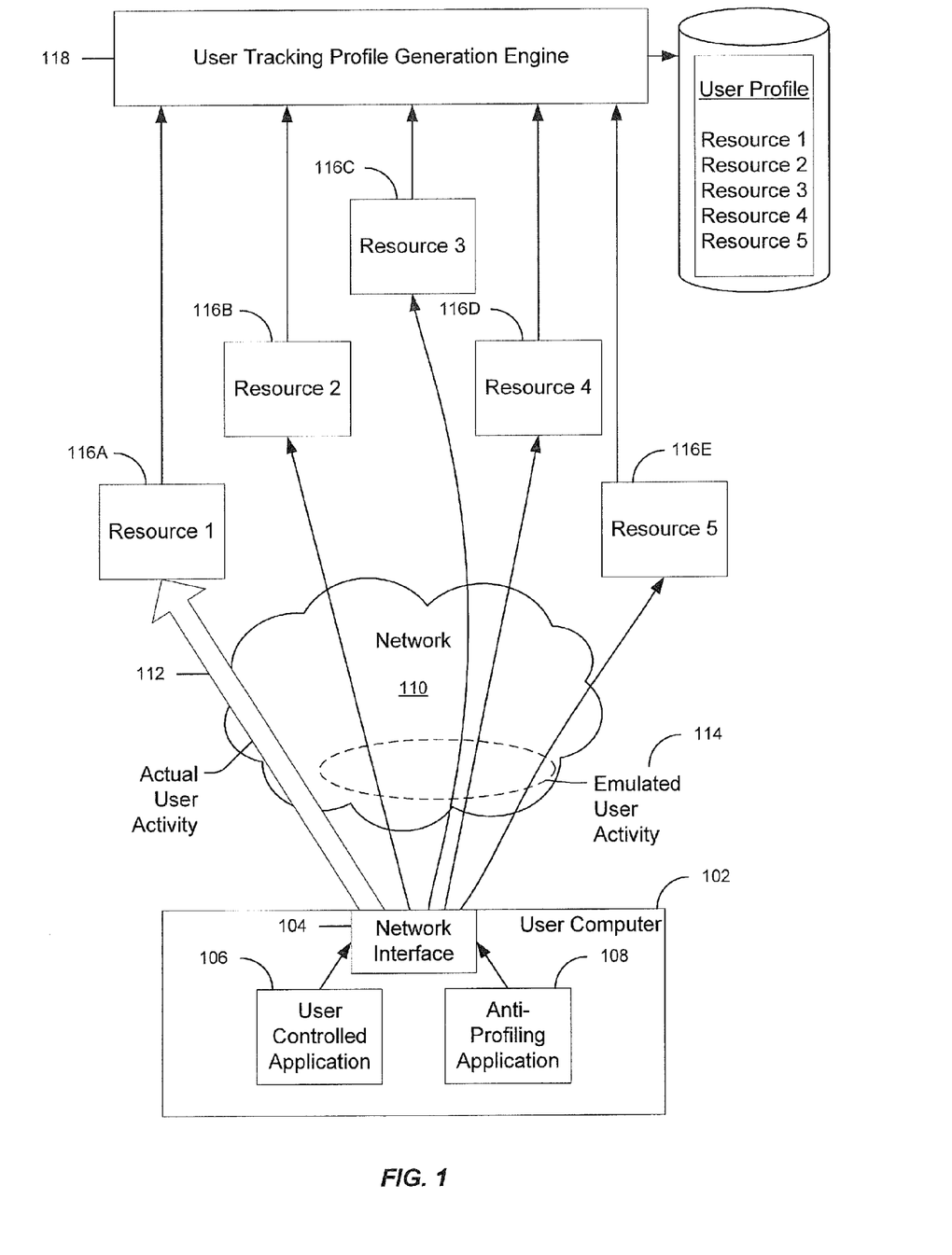
FIG. 1 is a block diagram of an embodiment of a system to generate emulated user activity for thwarting profiling services.

Referring to FIG. 1, an illustrative embodiment of a system to generate emulated user activity for use with user-profiling services is shown. The system includes a user computer 102 that includes a network interface 104 connected to a network 110. The user computer 102 also includes a user-controlled application 106 and an anti-profiling application 108. The user-controlled application 106 can be any application that a user interacts with that results in user network activity 112 being generated. For example, the user-controlled application 106 may be a browser that generates HTTP requests as a user of the browser accesses one or more websites on the network 110. Another example of a user-controlled application 106 is an email program allowing a user to create email messages that get transmitted over the network 110.

The anti-profiling application 108 is configured to monitor network activity corresponding to a particular use of the user computer 102. The anti-profiling application 108 is also configured to automatically generate emulated user network activity 114 when a particular usage pattern is detected in the monitored network activity. For example, the anti-profiling application 108 may be configured to automatically generate emulated user network activity 114 when it detects that a pre-determined amount of time has elapsed since network traffic has been transmitted from the user computer 102.

Figure 6:
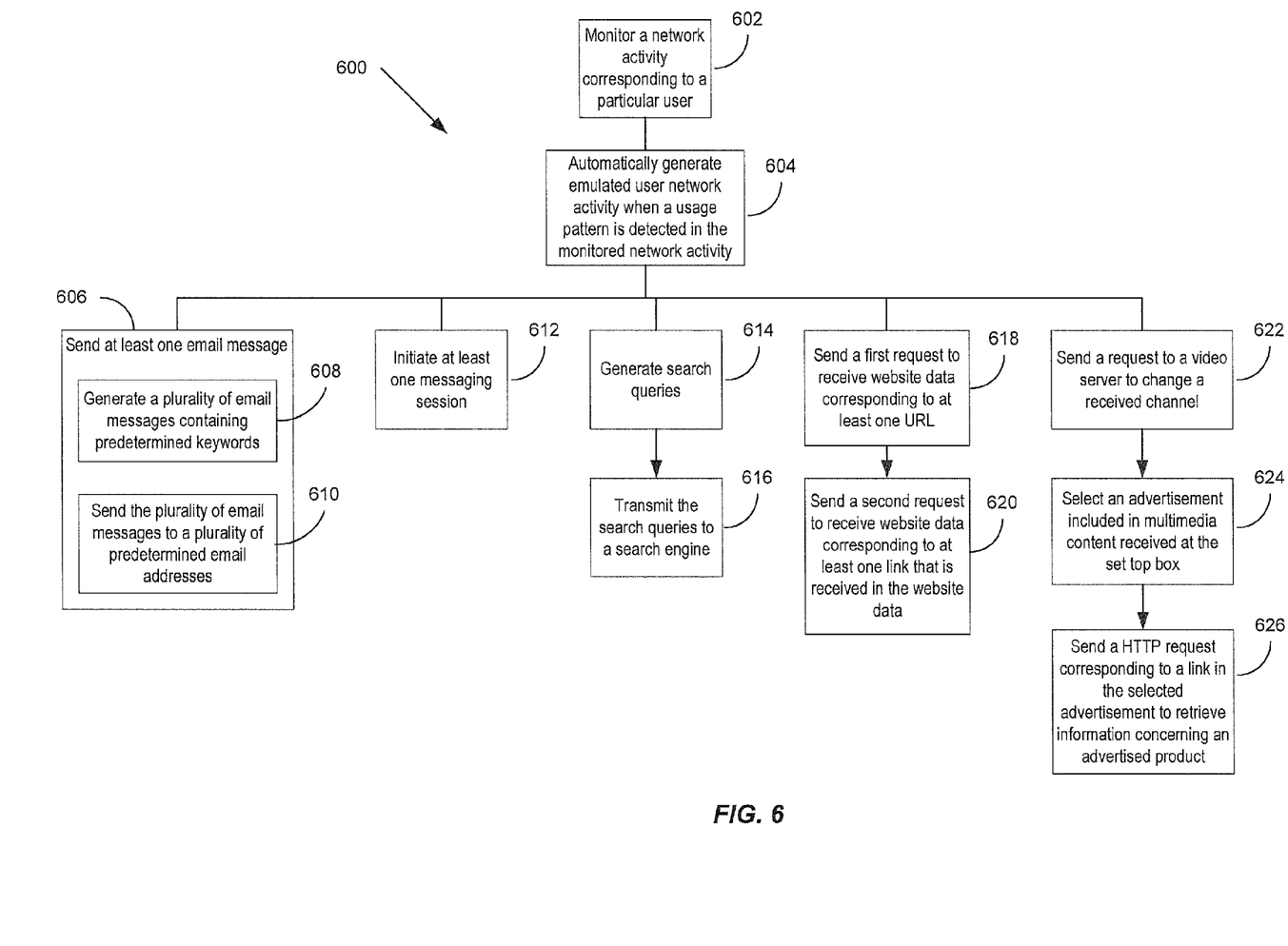
FIG. 6 depicts a particular embodiment of a method of generating emulated user network activity.

The user computer 102 may comprise a general computing device, such as the general computing device 600 illustrated in FIG. 6. For example, the user computer 102 may comprise a personal computer, a server, a set top box, or a mobile communications device (e.g., cell phone or PDA).

During operation, the user computer 102 executes the user-controlled application 106. The user controlled application 106 may generate actual user activity that can send one or more electronic messages over the network 110 to a plurality of resources 116 available to the user computer 102. For example, the user-controlled application 106 may generate network traffic that comprises actual user activity 112 (e.g., HTTP requests, email messages, instant messages, and search queries).

The user computer 102 also executes the anti-profiling application 108. The anti-profiling application 108 monitors the network activity 112 generated by the user-controlled application 106 and automatically generates emulated user network activity 114 when a usage pattern is detected in the monitored network activity 112. An example of a detected usage pattern may, for example, be a detected period of inactivity or a lack of transmitted network traffic over a predetermined period of time.

The network resources 116 receive both the actual user activity 112 and the emulated user activity 114. A user tracking profile generation engine 118 may track the actual user activity 112 and the emulated user activity 114 transmitted over the network 110 by the user computer 102. The user tracking profile generation engine 118 may not be able to differentiate between the actual user activity 112 and the emulated user activity 114. In this manner, the user tracking profile generation engine 118 may generate one or more user profiles from the combination of actual user activity 112 and the emulated user activity 114 transmitted from the user computer 102. The user tracking profile generation engine 118 may also generate one or more profiles for each of the resources 116. By providing the emulated user activity 114, the anti-profiling application 108 may obscure or otherwise affect the ability of the user tracking profile generation engine 118 to accurately profile the users of the user computer 102. Accordingly, the user tracking profiling generation engine 118 may attempt to generate one or more user profiles from the combination of the actual user activity 112 and the emulated user activity 114, making the generated profile or profiles inaccurate or obscured.

Figure 2:
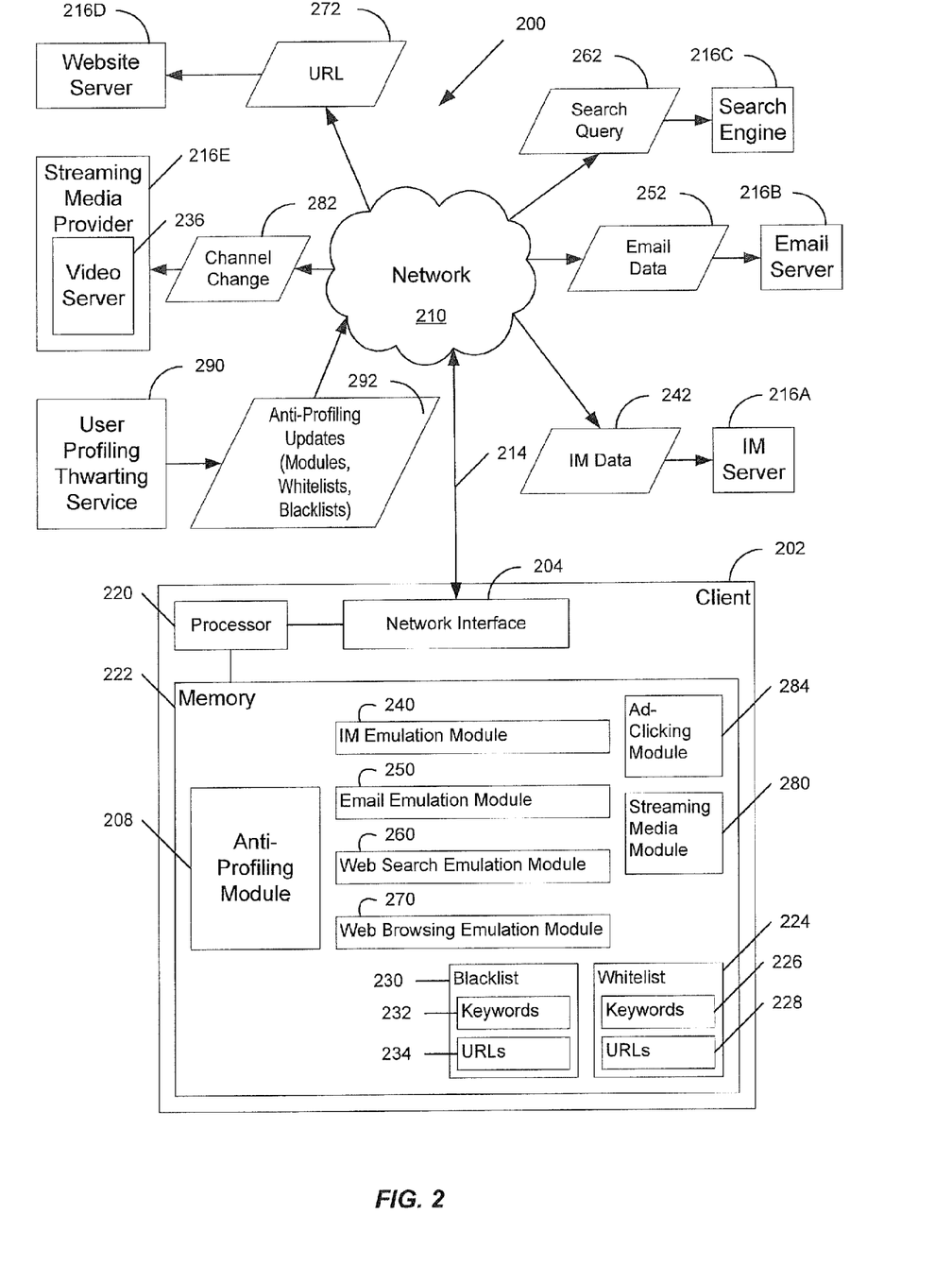
FIG. 2 is a block diagram of an embodiment of a system to generate emulated user network activity.

Referring to FIG. 2, a particular illustrative embodiment of a system to generate emulated user network activity 214 is depicted and generally designated 200. The system 200 comprises a client 202 that is configured to generate emulated user network activity 114 and to transmit the emulated user network activity 114 to resources 216 on the network 210. The resources 216 include an IM server 216A configured to receive IM data 242, an email server 216B configured to receive email data 252, a search engine 216C configured to receive search queries 262, a website server 216D configured to receive URLs 272, and a streaming media provider 216E configured to receive requests related to multimedia content available from a video server 236. The system 200 also includes a user-profiling thwarting service configured to provide data and computer software to the client 202.

The client 202 includes a network interface 204, a processor 220, and a memory 222. The network interface 204 is coupled to the network 210. The network 210 is coupled to a plurality of resources 216. For example, the network 210 is coupled to an IM server 216A, an email server 216B, a search engine 216C, a website server 216D, and a streaming media provider 216E. A user profiling thwarting service 290 has access to the client 202 via the network 210. The memory 222 includes an anti-profiling module 208, a whitelist 224, and a blacklist 230. The whitelist 224 includes a list of keywords 226 and a list of URLs 228. In a particular embodiment, the whitelist 224 includes keywords that are substantially uncorrelated to a preference or demographic of the particular user to obscure activity-based user profiling by a monitoring user tracking engine. In another particular embodiment, the whitelist 224 includes keywords that correlate to one or more predetermined user profiles to cause the user tracking engine to determine an inaccurate profile of the particular user. The blacklist 230 also includes a list of keywords 232 and a list of URLs 234. The memory 222 further includes an IM emulation module 240, an email emulation module 250, a web search emulation module 260, a web browsing emulation module 270, a streaming media module 280, and an advertisement clicking module 284. The processor 220 is coupled to the memory 222, such that the memory is accessible to the processor and the processor can execute one or more instruction of the modules in the memory 222. The processor 220 is also coupled to the network interface 204, such that results of executing one or more of the instructions in the modules in the memory 222 can be provided by the processor 220 to the network interface 204.

The processor 220 is configured to execute the anti-profiling module 208 to automatically generate and transmit a plurality of requests to the network resources 216 via the network 210 in response to detecting a particular activity or inactivity of the client 202. The plurality of requests are configured to be detected by a tracking engine as network activity of the user and to be used by the tracking engine to generate an obscured profile of the user. The whitelist 224 includes a list of keywords 226 that may be included in the plurality of requests generated by the anti-profiling module 208. The keywords 226 may also be used by the anti-profiling module 208 in selecting the resources 216 on the network 210 to which the plurality of requests are to be transmitted. The whitelist 224 is configured to include a list of URLs 228. The list of URLs 228 may include lists of destination addresses for resources 216 on the network 210 to which the anti-profiling module 208 may send the plurality of generated requests. The blacklist 230 includes a list of keywords 232 and a list of URLs 234. The list of keywords 232 includes keywords that the anti-profiling module 208 will not include in requests generated by the client 202 to be sent to resources 216 via the network 210. The list of URLs 234 includes URLs that the client 202 will not send the plurality of requests to. In general, the whitelist 224 contains keywords and URLs that may be used by the client 202 to generate emulated user network activity 214 and the blacklist 230 contains keywords and URLs that may not be used by the client 202 to generate emulated user network activity 214.

The IM emulation module 240 is configured to generate instant messages that may be included in the emulated user network activity 214. The email emulation module 250 is configured to generate email messages that may be included in the emulated user network activity 214. In particular embodiments, the email emulation module 250 includes one or more keywords 226 from the whitelist 224 in generated email messages. Additionally, the email emulation module 250 may send emails to one or more of the URLs 228 included in the whitelist 224. The web search emulation module 260 is configured to generate one or more search streams that include one or more keywords 226 in the whitelist 224. The web browsing emulation module 270 accesses one or more of the URLs listed in the list of URLs 228 of the whitelist 224. The streaming media module 280 accesses one or more channels of the streaming media provider 216E. In a particular embodiment, the ad-clicking module 284 emulates ad-clicking behavior of a user by choosing advertisements received from the streaming media provider 216E.

During operation, the client 202 monitors network activity corresponding to a particular user of the client. When the client detects a usage pattern in the monitored network activity, the client 202 automatically generates emulated user network activity 114. The detected usage pattern may include, for example, an absence of network activity for a predetermined period of time. Alternately, the detected usage pattern may include an amount of network activity of a particular type (e.g., email messages) that is below a pre-determined threshold. The processor 220 executes instructions in one or more of the modules in the memory 222 to generate the emulated user network activity 114. In a particular embodiment, the client 202 executes instructions in the IM emulation module 240 to generate an instant message. The instant message may contain keywords selected from the list of keywords 226 in the white list 224. The IM emulation module 240 may also ensure that no keywords found in the keyword list 232 of the blacklist 230 are present in the generated instant message. The client 202 may transmit the generated instant message as emulated network traffic 214 via the network 210 to the IM server 216A. The transmitted instant message is shown in FIG. 2 as IM data 242.

In a particular embodiment, the email emulation module 250 generates one or more email messages containing pre-determined keywords to be sent as emulated user network traffic 214 to one or more pre-determined email addresses. The email emulation module 250 may select one or more keywords 226 from the whitelist 224. The email emulation module 250 may also select one or more destination addresses for the generated email messages from the URL list 228. The email emulation module 250 transmits the generated email messages as emulated user network activity 214 via the network 210 to email server 216B. The transmitted email messages are shown in FIG. 2 as email data 252.

In a particular embodiment, the web search emulation module 260 generates and transmits one or more search queries 262. The search queries 262 generated by the web search emulation module 260 may include keywords selected from the keywords 226 found in the whitelist 224. The network address of the search engine 216C may be found in the URL lists 228. Once the search queries 262 are generated, they are transmitted as emulated user network activity 214 via the network 210 to the search engine 216C.

In a particular embodiment, the client 202 executes instructions in the web browsing emulation module 270. The web browsing emulation module 270 may select a network address of the website server 216D from the URL list 228 of the whitelist 224. The web browsing emulation module 270 may then transmit a HTTP request from the client 202 via the network 210 to the website server 216D as emulated user network activity 114. The transmitted network resource request, as shown in FIG. 2 as URL 272, is designed to make it appear to a user profiling mechanism as if the user is generating the network traffic to the website server 216D.

In a particular embodiment, the streaming media module 280 generates a usage pattern to be transmitted via the network 210 to the streaming media provider 216E. The transmitted usage pattern may include, for example, channel selections and/or program selections. In response to receiving the usage patterns generated and transmitted by the client 202, the streaming media provider 216E may select one or more videos from the video server 236. The selected one or more videos may then be transmitted back to the client 202. The ad-clicking module 284 selects one or more advertisements from the video received at the client 202 from the streaming media provider 216E. The selection of one or more ads in the received video is designed to make it appear to a user profiling mechanism monitoring the network traffic that a user of the client 202 has actually selected those particular advertisements.

For example, in a particular embodiment, the client 202 is in a set top box that sends a request to the video server 236 to change a received channel. The set top box selects an advertisement included in multimedia content received at the set top box and sends a HTTP request corresponding to a link in the selected advertisement to retrieve information concerning an advertised product.

In a particular embodiment, the client 202 is embodied in a website's server network. The client 202 automatically generates the emulated user network traffic 114 to affect profiling of the website by generating search queries 262 and transmitting the search queries 262 to the search engine 216C.

The client 202 may execute multiple modules to automatically generate multiple types of concurrent emulated user network activity 114. For example, in a particular embodiment, the client 202 automatically generates the emulated user network activity 114 by sending at least one email message 252 to the email server 216B, initiating at least one messaging session with the IM server 216A, submitting at least one search query 262 to the search engine 216C, and sending a first request 272 to the website server 216D to receive website data corresponding to at least one URL. The client 202 sends a second request to a website server to receive website data corresponding to at least one link that is received in the website data.

In a particular embodiment, the modules in the memory 222 of the client 202 may be updated by the user profiling thwarting service 290. The user profiling thwarting service 290 may generate and provide updates 290 to modules, whitelists and blacklists, for example, and transmit the updates 292 to the client 202. In this manner, the client 202 can have updated data and computer software designed to obscure the user-profiling engines used on the network.

Figure 3:
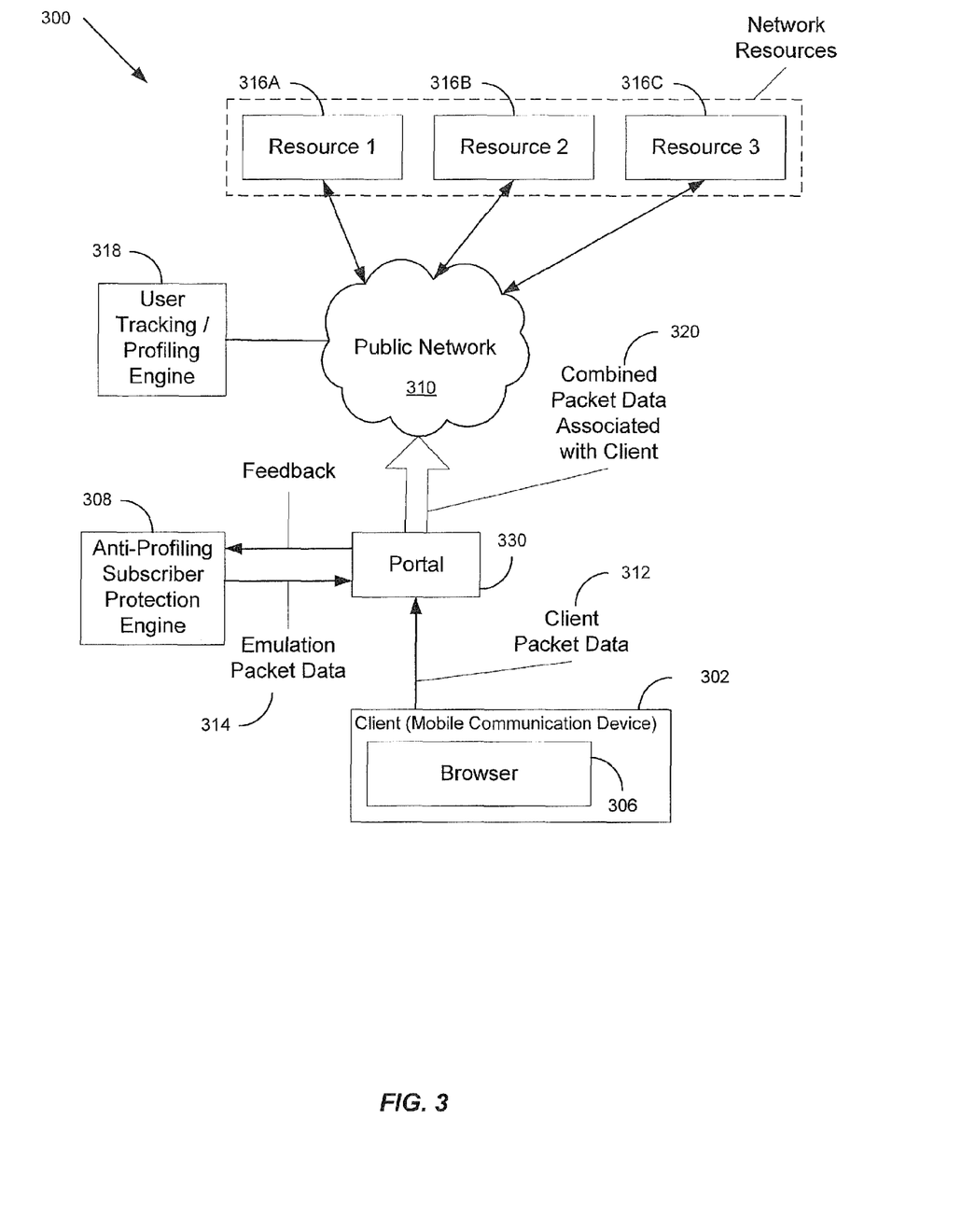
FIG. 3 is a block diagram of selected elements of an embodiment of a system to automatically generate emulated user network activity.

Referring to FIG. 3, a particular illustrative embodiment of a system 300 to automatically generate emulated user network activity is shown. The system 300 includes a client 302, a portal 330, and an anti-profiling subscriber protection engine 308. As illustrated, the client 302 is a mobile communications device, such as a mobile phone, personal digital assistant, portable gaming console, other portable computing device, or any combination thereof. The client 302 is configured to generate client packet data and to transmit the client packet data 312 to the portal 330 via wireless network, such as a wireless wide-area network or Wi-Fi network, to access one or more resources 316 via the public network 310.

The anti-profiling subscriber protection engine 308 is configured to automatically generate emulated user network activity 314 and to transmit the emulation packet data 314 to the portal 330. The portal 330 is configured to receive client packet data 312 and to receive emulation packet data 314. The portal is configured to transmit the combine packet data 320 via the network 310 to one or more resources 316. A user tracking profiling engine 318 is configured to monitor network activity on the public network 310. The user tracking profiling engine 318 may analyze the network traffic over the public network 310 to profile the portal 330. For example, the portal may be a proxy server used by a small business and the user tracking profiling engine 318 may attempt to profile the portal 330 to determine what kind of business uses the portal 330. Additionally, the user tracking profiling engine 318 may be able to track network traffic identifiable to particular users of the portal 330.

The client 302 includes a browser 306 configured to interact with a user of the client 302 to generate client packet data 312. The client 302 may include other applications that interact with a user of the client 302 to generate client packet data 312.

During operation, one or more users interact with the browser 306 on the client 302 resulting in the client 302 generating client packet data 312. The client packet data 312 is transmitted to the portal 330. In this manner, the portal 330 may include a server that enables multiple users to access the public network 310. The portal 330 also provides data to the anti-profiling subscriber protection engine 308.

The anti-profiling subscriber protection engine 308 automatically generates emulated user network activity, which is shown in FIG. 3 as the emulation packet data 314, to prevent accurate profiling of the multiple users. The emulation packet data 314 is transmitted to the portal 330. The portal 330 combines data received from the client 302 with data received from the anti-profiling subscriber protection engine 308 and transmits the combined data 320 over the public network 310 to one or more of the network resources 316A-C.

By generating the emulation packet data 314, the anti-profiling subscriber protection engine 308 may cause the user tracking profiling engine 318 to generate erroneous profile data. The user tracking profiling engine 318 tracks the combined data 320 and not just the client packet data 312. The user tracking profiling engine 318 may not observe any difference between the combined packet data 320 and actual client packet data 312 from the client. Accordingly, the user tracking profiling engine 318 generates a false profile of the portal 330, or of a user of the client 302, or both.

Although illustrated as a mobile communications device communicating via a wireless network, in other embodiments the client 302 may be any type of device that may communicate via a wireline network and/or a wireless network. For example, the client 302 may include a set top box device or personal computer that may be coupled to the portal 330 via a cable or digital subscribe line (DSL) access network.

Figure 4:
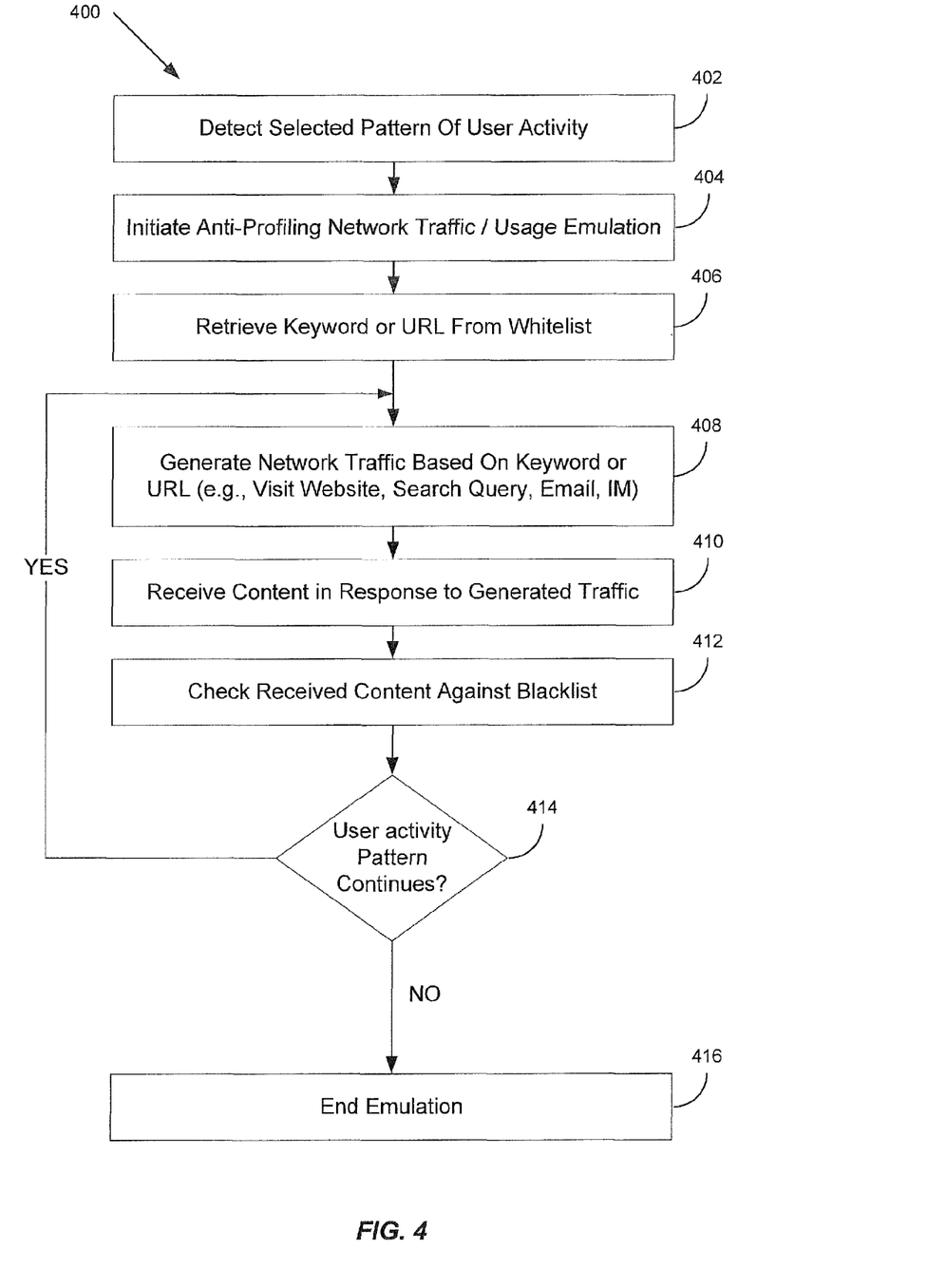
FIG. 4 depicts a flow chart of a first particular embodiment of a method of generating emulated user network activity.

FIG. 4 depicts a flow chart of a particular embodiment of a method 400 of emulating user network activity. The method 400 can be performed, for example, by systems such as the user computer 102 of FIG. 1, the client 202 of FIG. 2, and the anti-profiling subscriber protection engine 308 of FIG. 3, or any combination thereof. The system performing the method 400 detects a selected pattern of user activity, at 402. Detecting the selected pattern of user activity may result from monitoring the user's network activity. The pattern of user activity may comprise, for example, a lack or absence of network activity for a predetermined period of time. For example, a system configured to emulate user network activity monitors a particular user's network activity and may detect that the monitored network activity level attributed to the user has dropped below a predetermined threshold. Also, the pattern of user activity may comprise activity indicating that the user is online. Advancing to 404, the system initiates anti-profiling network traffic/usage emulation in response to detecting the pattern of user activity. The system retrieves one or more keywords or one or more universal resource locators (URLs) from a whitelist, at 406. The whitelist may be a pre-populated searchable database with a list of allowable keywords and allowable URLs. An example whitelist 224 is shown in FIG. 2.

Advancing to 408, the system generates network traffic based on one or more keywords or one or more URLs. The keyword(s) or URL(s) may be the keyword(s) or URL(s) retrieved from the whitelist. For example, the system may automatically generate emulated user network activity. In a particular embodiment, the emulated user network activity is detectable by a user tracking engine, such as the User Tracking Profile Generation Engine 118, as the network activity of the particular user.

In a particular embodiment, the system generates network traffic to access one or more websites on a network. For example, the system 200 of FIG. 2 may generate one or more HTTP requests using one or more URLs retrieved from the URLs 228 in the whitelist 224 and may transmit the HTTP requests 272 via the network 210 as emulated user network activity 214.

In another particular embodiment, the system generates search queries and transmits the search queries to one or more search engines via a network. For example, the system 200 of FIG. 2 may generate search queries that include one or more keywords chosen from the keywords 226 in the whitelist 224. The system may transmit the search queries 262 over the network 210 to a search engine 216C as emulated user network activity 214. The network address of the search engine 216C may be determined by one or more URLs retrieved from the URLs 228 in the whitelist 224.

In another particular embodiment, the system generates email messages and transmits the email messages to one or more email servers via a network. For example, the system 200 of FIG. 2 may generate email messages that include one or more keywords chosen from the keywords 226 in the whitelist 224. The system may transmit the email messages 252 to the email server 216B on the network 210. The network address of the email server 216B may be determined by one or more URLs retrieved from the URLs 228 in the whitelist 224. Additionally, the recipients of the email messages 252 may be designated in the whitelist 224.

In another particular embodiment, the system generates instant messages ("IMs") and transmits the IMs to one or more IM servers via a network. The system may generate IMs that include one or more keywords chosen from the keywords 226 in the whitelist 224. The system may transmit the IMs 242 to the IM server 216A on the network 210. The network address of the IM server 216A may be determined by one or more URLs retrieved from the URLs 228 in the whitelist 224. Additionally, the recipients of the IMs 242 may be designated in the whitelist 224.

Advancing to 410, the system receives content in response to generating the network traffic. In a particular embodiment, the system receives one or more web pages in response to transmitting HTTP requests to websites on a network. In another particular embodiment, the system receives search results from one or more search engines in response to transmitting search queries to the one or more search engines. In another particular embodiment, the system receives one or more email messages in response to transmitting email messages to one or more email servers. In another particular embodiment, the system receives one or more IMs in response to transmitting IMs to one or more IM servers. The system may parse the received content for keywords and URLs to be used in generating additional network traffic. Advancing to 412, the system checks the received content against a blacklist. The blacklist may be a pre-populated searchable database with blocked (i.e., not allowable) keywords and blocked URLs.

Advancing to 414, the system determines whether the selected pattern of user activity detected at 402 continues. If the selected pattern of user activity does not continue then the system advances to 416 and the emulation ends. If the selected pattern of user activity does continue then the system returns to 408 and continues generating emulated user network activity.

Figure 5:
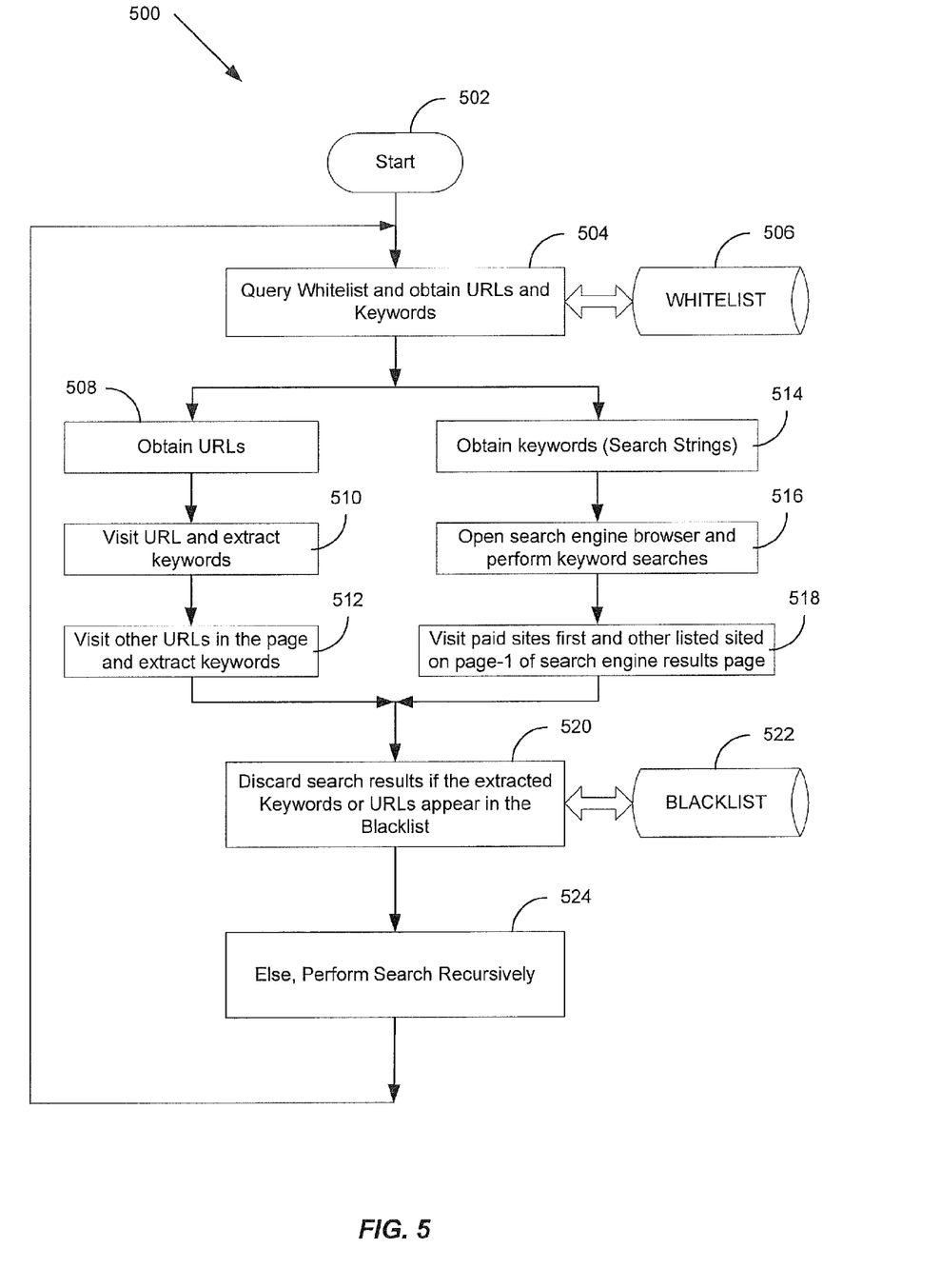
FIG. 5 depicts a flow chart of a second particular embodiment of a method of generating emulated user network activity.

FIG. 5 depicts a flow chart of a particular embodiment of a method 500 of emulating user network activity. The method 500 can be performed, for example, by systems such as the user computer 102 of FIG. 1, the client 202 of FIG. 2, and the Anti-Profiling Subscriber Protection Engine 308 of FIG. 3. The method 500 starts at 502. Advancing to 504, the system queries a whitelist 506 to obtain one or more keywords or one or more URLs.

The system obtains one or more URLs at 508. Advancing to 510, the system visits network resources designated by the obtained URL(s) and extracts keywords from web pages received from the network resource(s). The system may then emulate user browsing behavior by visiting URLs included in received web pages and by extracting keywords from additional received web pages, at 512.

Alternately or in addition, the system may advance to 514 after querying the whitelist 506. The system obtains keywords, which may include search strings, at 514. Advancing to 516, the system opens a search engine browser and performs keyword searches. Proceeding to 518, the system first visits higher priority web sites that are received on a results page received in response to the keyword searches, such as sponsored lists of organizations paying to have their sites listed in the search results. The system may then visit other sites included in the results page. After 518, the system advances to 520.

Advancing to 520, the system discards the search results if the extracted keyword(s) and URL(s) appear in the blacklist 522. The system then recursively continues performing the search and URL visits using prior-obtained results or by re-accessing the whitelist, at 524.

Referring to FIG. 6, a method 600 of generating emulated user network activity is depicted. In an illustrative embodiment, the method 600 may be performed by the anti-profiling application 108 of FIG. 1, the anti-profiling module 208 of FIG. 2, the anti-profiling subscriber protection engine 308 of FIG. 3, or any combination thereof. At 602, a network activity corresponding to a particular user is monitored. Advancing to 604, the emulated user network activity is automatically generated when a usage pattern is detected in the monitored network activity. For example, the usage pattern may indicate a period of high activity or a period of low activity. Alternatively, or in addition, the usage pattern may be selectable or configurable to enable detection of specific types of activity such as email activity, web browsing activity, instant messaging activity, one or more other types of activity, or any combination thereof.

In a particular embodiment, automatically generating the emulated user network activity includes at least one of sending at least one email message, initiating at least one messaging session, submitting at least one search query to a search engine, and sending a first request to receive website data corresponding to at least one uniform resource locator (URL) and sending a second request to receive website data corresponding to at least one link that is received in the website data. The emulated user network activity is detectable by a user tracking engine as the network activity of the particular user. For example, the emulated user network activity may be configured to be detected by the user tracking profile generation engine 118 of FIG. 1 and included into the profile of the particular user in addition to the actual user activity 112. To illustrate, the emulated network activity may include one or more network addresses or other identifiers that may indicate the particular user or client as the source of the emulated activity. In another embodiment, automatically generating the emulated user network activity is performed by a server that enables multiple users to access a public network to modify profiling of the multiple users.

The emulated user network activity may traverse a network in a pre-determined automated manner to thwart end-user profiling by the user tracking engine. For example, the emulated network activity may be generated in accordance with one or more predetermined algorithms and in conjunction with a whitelist or approved URLs or keywords, a blacklist of URLs or keywords, or both, such as in accordance with the method 500 of FIG. 5. The emulated user activity may be generated by a user computer to foil attempts by search engines, internet service providers (ISPs), and content providers to generate accurate end-user profiles based on activity tracking, such as for targeted ad insertion.

In another embodiment, automatically generating the emulated user network activity may be performed at a mobile communications device, such as a mobile phone, personal digital assistant (PDA), notebook or tablet computer, or any other portable communication device that enables a user to wirelessly communicate via a network. The mobile communications device may run a compact version of an operating system such as a commercially available operating system of a custom tailored operating system. The mobile communication device may be provided with software that is pre-installed or that is provided by a third-party to automatically generate the emulated user activity.

Continuing to 606, in a particular embodiment, automatically generating the emulated user network activity includes generating and sending electronic mail (email) messages. As will be discussed with respect to FIG. 7, a plurality of email messages containing predetermined keywords may be generated, at 608. The plurality of email messages may be sent to a plurality of predetermined email addresses, at 610. Alternatively, or in addition, at least one messaging session may be initiated and at least one instant message may be sent, at 612.

In a particular embodiment, automatically generating the emulated user network activity is performed at a website's server network to change profiling of the website. For example, automatically generating the emulated user network activity may include generating search queries, at 614, and transmitting the search queries to a search engine, at 616. To illustrate, an intermediate website that receives keyword search requests from end users, transmits the search request to a search engine, then retrieves the results and routes the results back to the end user, may be susceptible to profiling. A search engine may attempt to profile the intermediate website based on multiple search queries submitted by the website's users. Once the website is profiled, users visiting the website may see ads tailored to them based on previous search queries. When the intermediate website's server network is configured in accordance with one or more of the disclosed embodiments, attempts by search engines to profile the intermediate website may be foiled.

In a particular embodiment, automatically generating the emulated user network activity includes automatically sending a plurality of requests to access network resources via a public network. A first request may be sent to receive website data corresponding to at least one uniform resource locator (URL), at 618, and a second request to receive website data corresponding to at least one link that is received in the website data may be sent, at 620. For example, automatically sending the plurality of requests to access network resources may include automatically generating a hypertext transfer protocol (HTTP) request to a network resource and sending the HTTP request via the public network. The automatically generated HTTP request may include header information mimicking an end-user computing device. A link to the network resource may be automatically selected from a previously accessed network resource. The previously accessed network resource may be identified by a search results list corresponding to a query submitted to a search engine. Thus, the automatically generated network traffic may mimic a user web browsing session that includes a search query, following links provided by the search results, and following links from successively retrieved pages, in a manner that is difficult to distinguish from actual user behavior.

In a particular embodiment, at least one keyword may be selected from a first list of keywords, and at least a first portion of the emulated user network activity may be generated based on the at least one keyword. The first list of keywords may includes keywords that are substantially uncorrelated to a preference or demographic of the particular user to thwart activity-based user profiling by the user tracking engine with respect to the particular user. For example, the first list of keywords may include keywords that are selected substantially randomly or without regard for preferences of any one or more actual users. In another embodiment, the first list of terms includes keywords that correlate to one or more predetermined user profiles to cause the user tracking engine to determine an inaccurate profile of the particular user.

In a particular embodiment, automatically generating the emulated user network activity is performed on a set top box device and includes sending a request to a video server to change a received channel, at 622. In addition, an advertisement included in multimedia content received at the set top box may be selected, at 624, and a HTTP request corresponding to a link in the selected advertisement may be sent to retrieve information concerning an advertised product, at 626. To illustrate, Internet Protocol television (IPTV) and digital cable-based systems may gather online viewing behavior of users and deliver targeted ads. Customer profiling in such systems may be based on viewing patterns such as how long and what channels were viewed, what ads were viewed and not viewed as well as what follow up actions were taken (e.g. visiting a store web site) after the ads were viewed. By emulating viewing behavior and responsiveness to advertisements, the emulated user activity may render such user profiling attempts ineffective via random or pseudo-random channel selection and ad responses.

For example, a set top box (STB) device that is open to allow the addition of third party software may have functionality added to provide the ability to programmatically (automated and without human intervention) to select ads displayed on a screen coupled to the STB. In this manner, the software may mimic the behavior of a user 'clicking' on a television remote control device to select an advertisement. To the ISP or content provider, such activity would appear no different than a person making a selection by using the television remote control device. Similarly, the STB may have the added functionality to change channels randomly or pseudo-randomly, select (click on) ads displayed on the TV screen and select (click on) links go into the internet sites find further information about the product.

Similar to the STB scenario described above, an IPTV (or digital cable) program can also be viewed through general purpose computer, such as a desktop PC or a laptop computer, in which case the 'clicking' (e.g., to change channels or select an advertisement) is done with a mouse. This 'clicking' action of a computer mouse (or keypad unit) can be emulated according to embodiments disclosed herein, to mimic the online behavior of a user of the general computing device.

Figure 7:
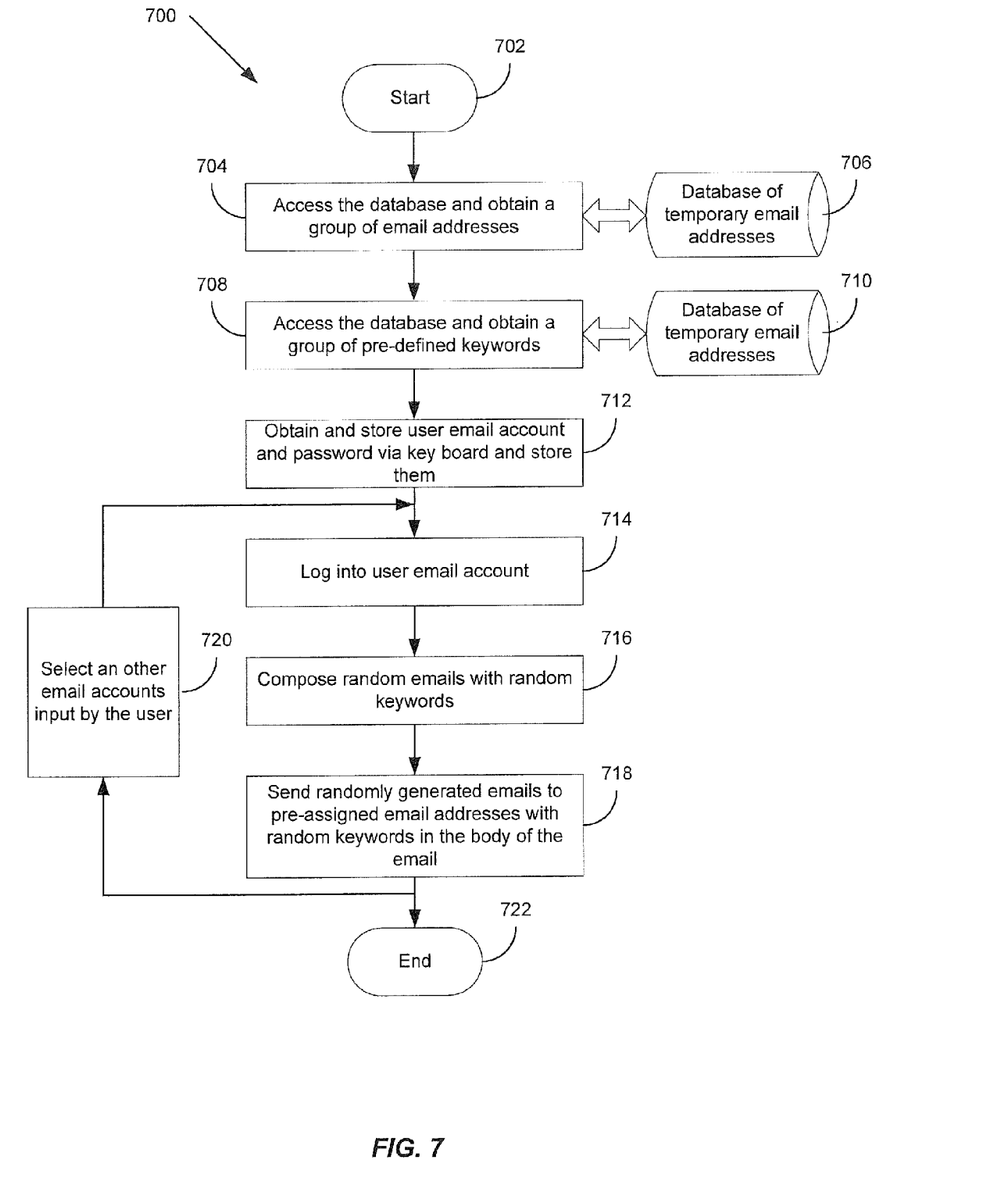
FIG. 7 depicts a flow chart of a third particular embodiment of a method of generating emulated user network activity.

FIG. 7 depicts a flow chart of a particular embodiment of a method 700 of generating emulated user network activity. In a particular embodiment the method 700 enables protection against user profiling via email or instant messaging tracking or 'snooping.' A prevalent form of user-profiling is via unsolicited reading of emails and/or instant messages by mail servers. Attempts by ISPs, content providers, and others to read email content with the intent to form user-profiles may be undermined through the generation of many random or pseudo-random emails with non-user-descriptive content that is sent to a multitude of pre-determined email addresses. These emails will contain pre-selected harmless keywords, such as from a whitelist. Any mail server attempting to read email content to form user-profiles for unsolicited action will read content substantially unrelated, or only accidentally related, to actual user demographics, user preferences, or other profile information.

The method 700 starts at 702. Advancing to 704, the database 706 of temporary email addresses is accessed and a group of email addresses is obtained. A database 710 of temporary email addresses is accessed and a group of pre-defined keywords is obtained, at 708. A user email account and password via a keyboard are obtained and stored, at 712. Continuing to 714, the user email account is logged into, and random or pseudo-random emails are composed with random or pseudo-random keywords, at 716. The randomly or pseudo-randomly generated emails are sent to pre-assigned email addresses with random keywords in the body of the email, at 718. Moving to 720, another email account is selected of email accounts that have been input by a user.

Creating the database of temporary email addresses can be accomplished without sending unsolicited communications, or "spamming," other internet users. For example, a vendor may set aside several domains and create an 'email address pool' expressly for this purpose. The email addresses and the domain may be accessible to the users of the method 700. As another example, the vendor of 'modified web-crawler' may create temporary domains that can create email addresses on the fly. Such domains may currently exist for public use. A system that implements the method 700 may access the vendor site and will obtain a multitude of email addresses for sending purposes.

The email addresses themselves need not be real or active. A system that implements the method 700 may generate random email addresses (e.g. xyz51324@wahooxyz.com) for this purpose. The email itself may bounce back. However, the mail server reading the email content may not be aware of this fact and may treat as a regular email written and sent by a human user.

The web domains (e.g.—.com) themselves could also be created by the vendor of a system that implements the method 700. The domain names may frequently be changed so that the search engine may not identify and blacklist the pool of domain names.

Figure 8:
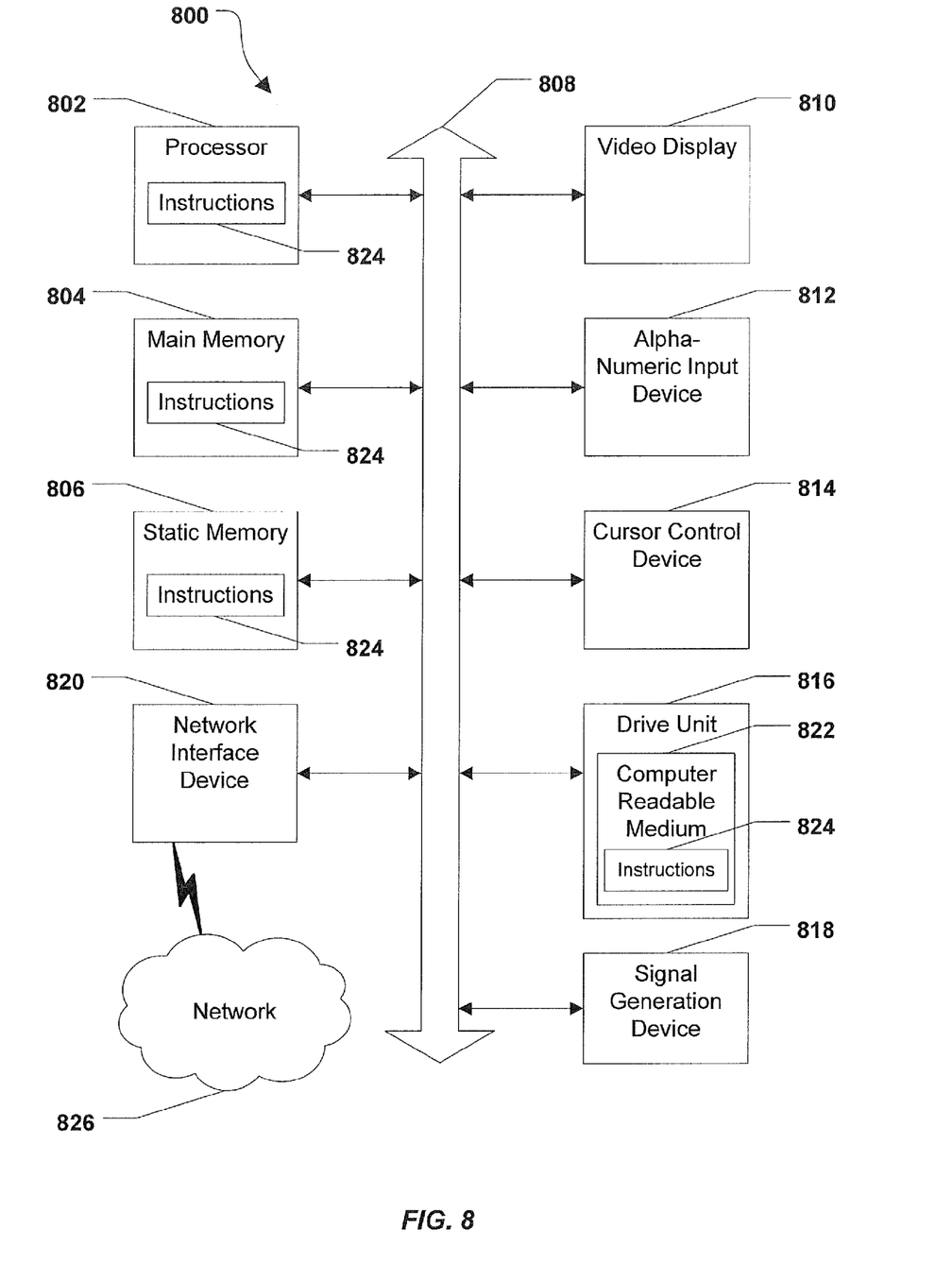
FIG. 8 depicts an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. For example, the computer system 800 may include or be included within any one or more of the processors, computers, communication networks, servers, media processing resources, or media device, as shown in FIGS. 1-3.

In a networked deployment, the computer system may operate in the capacity of a server or as a client user computer in a server-client user network environment, or as a peer computer system in a peer-to-peer (or distributed) network environment. The computer system 800, or portions thereof, can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a control system, a camera, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video, and data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), a projection television display, a flat panel display, a plasma display, a solid state display, or a cathode ray tube (CRT). Additionally, the computer system 800 may include an input device 812, such as a remote control device having a wireless keypad, a keyboard, a microphone coupled to a speech recognition engine, a camera such as a video camera or still camera, or a cursor control device 814, such as a mouse device. The computer system 800 can also include a disk drive unit 816, a signal generation device 818, such as a speaker or a remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal; so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable medium or other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, and HTTP) as well as television standards (e.g., SDTV, NTSC, PAL, SECAM, HDTV, ATSC, DVB-T, and ISDB-T) represent examples of the state of the art. Such standards are periodically superseded by faster or more efficient standards having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a processor; and
   a memory accessible to the processor, the memory including instructions that, when executed by the processor, cause the processor to perform operations comprising:
   detecting, based on monitored network communications of a user device over a network, a period of inactivity at the user device that follows a period of user initiated network activity at the user device, the period of user initiated network activity associated with user input at the user device;
   receiving control data from a first device associated with an anti-profiling service, wherein the control data includes a first list of keywords unavailable to generate additional network activity, a first list of universal resource locators unavailable to generate the additional network activity, or combinations thereof; and
   in response to detecting the period of inactivity, sending a communication via the network to generate additional network activity associated with the user device, the communication based on the control data, wherein the additional network activity is configured to obscure profile data included by a user tracking profile generation engine in a user profile associated with the user device, the profile data corresponding to the user initiated network activity.

2. The system of claim 1, wherein generating the additional network activity includes:
   submitting a search query to a search engine; and
   submitting a hypertext transfer protocol request corresponding to a search result generated by the search engine.

3. The system of claim 1, wherein the operations further include identifying a second list of keywords stored in the memory, the second list of keywords including keywords that are uncorrelated to a user preference and demographic information associated with a user of the user device, wherein the communication is based on a particular keyword in the second list of keywords, wherein the particular keyword is not included in the first list of keywords.

4. The system of claim 1, wherein the additional network activity emulates activity of a user of the user device.

5. The system of claim 1, wherein sending the communication comprises sending a plurality of requests to access a network resource via a public network.

6. The system of claim 5, wherein sending the plurality of requests comprises automatically generating a hypertext transfer protocol request and sending the hypertext transfer protocol request via the public network.

7. The system of claim 1, wherein the operations further comprise, in response to detecting user activity at the user device during generation of the additional network activity, ceasing generation of the additional network activity.

8. A method comprising:
   detecting, based on monitored network communications of a user device over a network, a period of inactivity at the user device that follows a period of user initiated network activity at the user device, the period of user initiated network activity associated with user input at the user device;
   receiving control data from a first device associated with an anti-profiling service, wherein the control data includes a first list of keywords unavailable to generate additional network activity, a first list of universal resource locators unavailable to generate the additional network activity, or combinations thereof; and
   in response to detecting the period of inactivity, sending a communication via the network to generate additional network activity associated with the user device, the communication based on the control data, wherein the additional network activity is configured to obscure profile data included by a user tracking profile generation engine in a user profile associated with the user device, the profile data corresponding to the user initiated network activity.

9. The method of claim 8, wherein sending the communication includes:
   generating a search query; and
   transmitting the search query to a search engine.

10. The method of claim 8, wherein generating the additional network activity further includes:
    identifying a channel randomly or pseudo-randomly; and
    sending a request to a video server to receive the channel.

11. The method of claim 8, wherein generating the additional network activity further includes:
    selecting an advertisement included in multimedia content; and
    sending a hypertext transfer protocol request to a device associated with the advertisement based on a link included in the advertisement.

12. The method of claim 8, wherein the additional network activity is generated at the user device.

13. The method of claim 8, wherein the additional network activity emulates activity of a user of the user device.

14. The method of claim 13, wherein the control data further includes a list of keywords available to generate the additional network activity, a list of universal resource locators available to generate the additional network activity, or a combination thereof.

15. The method of claim 14, wherein sending the communication comprises sending a plurality of requests to access a network resource via a public network.

16. The method of claim 8, further comprising receiving second control data from the first device associated with the anti-profiling service after generating the additional network activity, wherein the control data includes first information and the second control data includes second information different from the first information.

17. A computer readable storage device comprising instructions that, when executed by a processor, cause the processor to perform operations comprising:
- detecting, based on monitored network communications of a user device over a network, a period of inactivity at the user device that follows a period of user initiated network activity at the user device, the period of user initiated network activity associated with user input at the user device;
- receiving control data from a first device associated with an anti-profiling service, wherein the control data includes a first list of keywords unavailable to generate additional network activity, a first list of universal resource locators unavailable to generate the additional network activity, or combinations thereof; and
- sending a communication via the network to generate additional network activity associated with the user device, the communication based on the control data, wherein the additional network activity is configured to obscure profile data included by a user tracking profile generation engine in a user profile associated with the user device, the profile data corresponding to the user initiated network activity.

18. The computer readable storage device of claim 17, wherein generating the additional network activity further includes generating a random or pseudo random email message and sending the email message.

19. The computer readable storage device of claim 18, wherein the email message is sent to a randomly generated email address.

20. The computer readable storage device of claim 17, wherein generating the additional network activity further includes sending a request to a video server to receive streaming media content.

* * * * *